T. Kell,
Cage Trap,
No 621,    Patented Mar. 3, 1838.
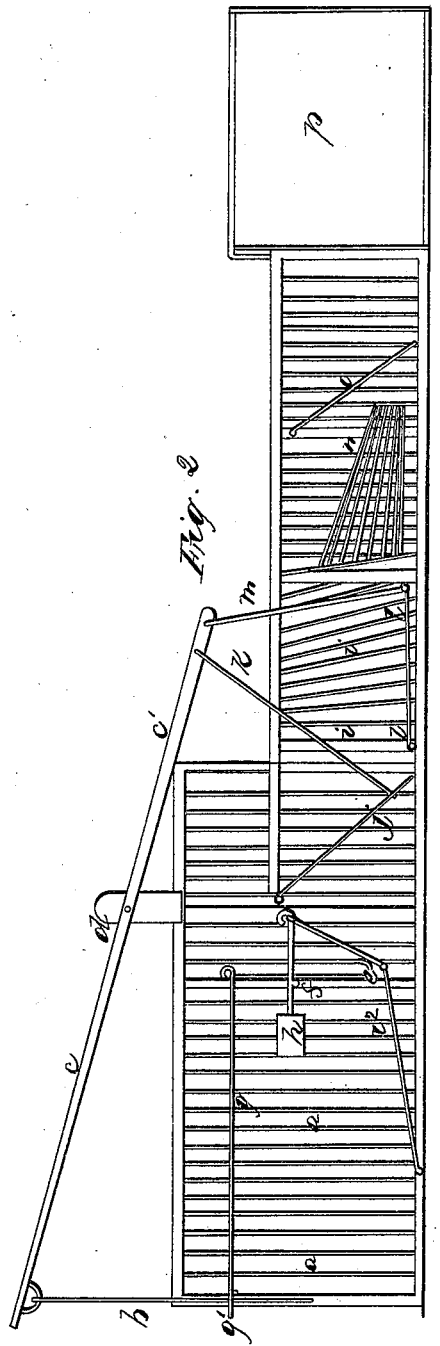
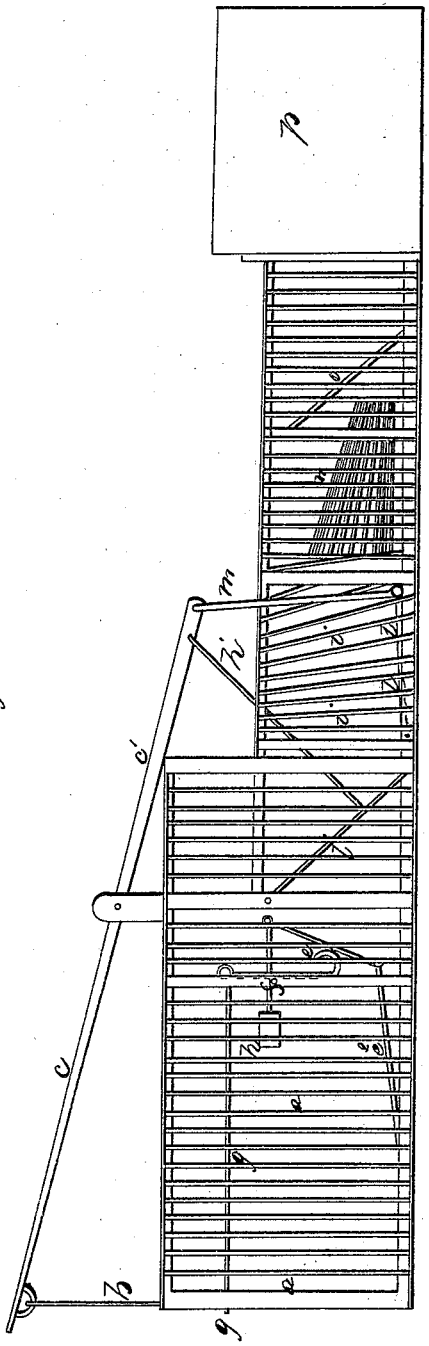

UNITED STATES PATENT OFFICE.

THOMAS KELL, OF ALEXANDRIA COUNTY, DISTRICT OF COLUMBIA.

TRAP FOR CATCHING RATS AND OTHER ANIMALS.

Specification of Letters Patent No. 621, dated March 3, 1838.

*To all whom it may concern:*

Be it known that I, THOMAS KELL, of the county of Alexandria, in the District of Columbia, have invented a new and Improved Trap for Catching Rats and other Animals, which I denominate "The Perpetual or Self-Setting Rat-Trap;" and I do hereby declare that the following is a full and exact description thereof.

Figure 1 in the accompanying drawing is a side view of the trap and Fig. 2 a similar view, one side being removed to show the arrangement of the levers, platforms and other parts the more clearly.

The front compartment of the trap $a$, $a$ where the animal is to enter, and which contains the bait, has a sliding door $b$ attached to the lever $c$ working on a fulcrum at $d$. The bait is to be attached to the hook $e$, the hooked piece or trigger has a fulcrum at $f$, and at its upper end it forms a joint with a bolt $g$. There is an opening, or hole, in the door $b$ through which the end $g^1$ of the bolt passes when the door is raised, but it merely rests against said door when it is down.

The trap is shown as with the door raised and the bolt holding it up, but when a rat enters and presses the platform $e^2$ or takes hold of the bait drawing it toward him this will retract the bolt and the door will fall confining the rat or other animal. A weight $h$ sufficient to cause the bolt to press lightly against the door, is attached to the hooked piece $e$, either with or without the jointed lever or wires shown in the drawing which however serves to make it work steadily. The retreat of the animal is cut off by the falling of the door $b$, but the same action opens a way into a second compartment $i$, $i$, the end $c'$ of the lever rising raises the sloping trap door $j$ by means of the connecting rod $k$. The rat then advances upon the draw bridge or platform $b$, $b$, his weight upon which will suffice to draw down the end $c^1$, of the lever $c$, through the medium of the connecting rod $m$, which will also close the trap door $j$ and reset the trap, the bolt $g$ passing into the opening made in the door to receive it. A conical passage formed of pointed wires $n$, made in a manner well known will allow the rat to advance still farther, and there may also be a second sloping trap door $o$, which he may raise, and which will afterward fall by its own weight. It is believed, however, that one of these devices will suffice, although both may be used if desired.

At the back end of the trap there is a receptacle $p$, which may be detached therefrom at pleasure, it being furnished with a sliding door, and such other appendages as may be desired. The size and form of this receptacle may be varied at pleasure.

Having thus fully described the nature of my invention and shown the manner in which the various parts of my trap are constructed and operate, I do hereby declare that I do not claim either of the parts which I have described separately and distinctly from the state of combination in which they exist with the other portions thereof; but—

What I do claim is—

The manner in which the operation of self setting is effected, as above made known, without, however, intending by this claim to confine myself to the precise arrangement set forth, but to vary the same as I may think proper, while the construction is substantially the same.

THOMAS KELL.

Witnesses:
CLEMENT T. COOTE,
LINTON THORN.